Patented Jan. 21, 1936

2,028,335

UNITED STATES PATENT OFFICE 2,028,335

PROCESS FOR DESULPHURIZING A PETROLEUM OIL DISTILLATE

Vladimir Kalichevsky, Elizabeth, N. J., assignor to Standard Oil Development Company, a corporation of Delaware No Drawing. Application April 10, 1931, Serial No. 529,302

5 Claims. (Cl. 196—32)

The present invention relates to improvements in sweetening and corrosion treatment of petroleum distillates by removing the objectionable sulphur compounds with a mixture of sodium and potassium hydroxides. The invention will be fully understood from the following description.

The action of the alkali hydroxides on sulphur compounds present in the oil has been known for a considerable length of time, but previous inventors failed to detect the differences in the chemical reactivity of the individual hydroxides towards certain groups of sulphur compounds frequently found in petroleum distillates. I have found that by using a certain mixture of alkali hydroxides in the solid state or in solution in various non-aqueous solvents superior treating results may be obtained and the time of treating may be considerably shortened.

The experimental work on which this invention is based revealed that sodium hydroxide when applied to the oil in a proper manner has primarily a sweetening effect by removing the mercaptans while potassium hydroxide removes from the oil the elementary sulphur and other corrosive sulphur compounds. Though either one of the hydroxides may eventually remove both types of sulphur compounds from the oil, the time required for such treatment is prohibitively long. For instance, while sodium hydroxide is capable of removing the sour sulphur compounds in a few minutes, and when applied in presence of certain non-aqueous solvents even in a few seconds time, the same reagent requires several days to show some action on the corrosive sulphur compounds in the oil. On the other hand, potassium hydroxide is considerably more active towards the corrosive sulphur compounds in the oil than towards the sour sulphur compounds.

This observation was corroborated by investigating the action of sodium and potassium hydroxide mixtures on petroleum distillates which contained both sour and corrosive sulphur. Both types of sulphur compounds were removed from the oil which, after such treatment, passed not only the copper strip corrosion test and doctor test but also the metallic mercury test thus showing a very high degree of refinement.

The experimental work showed that sodium hydroxide removes efficiently 0.8 lb. of sour sulphur per 1 lb. of the reagent (equivalent to about 1¼ lbs. NaOH per lb. of sour sulphur) while potassium hydroxide removes efficiently 1.7 lbs. of corrosive sulphur per 1 lb. of the reagent. By securing a proper contact and by keeping the mixture well agitated in absence of air and moisture as much as 3.0 lbs. of corrosive sulphur might be removed by one pound of potassium hydroxide (in other words this is equivalent to about ⅓ to ⅔ lb. KOH per lb. of corrosive sulphur). This permits an easy calculation of the mixture of sodium and potassium hydroxides which should be used in treating any type of petroleum distillate provided its sour and corrosive sulphur content is previously determined by any of the standard tests known in the art. The ratio of NaOH to KOH which should be used in treating a certain petroleum distillate is then calculated as follows:

$$\frac{\text{lbs. NaOH}}{\text{lbs. KOH}} = \frac{\text{lbs. sour S}/0.8}{\text{lbs. corrosive S}/1.7}$$

or if good agitation in absence of air and moisture is secured:

$$\frac{\text{lbs. NaOH}}{\text{lbs. KOH}} = \frac{\text{lbs. sour S}/0.8}{\text{lbs. corrosive S}/3.0}$$

These two equations give the two economic limits for the NaOH to KOH ratio in the treating mixture. If these limits are not observed one or the other of the reagents will not be completely consumed.

Following this rule a sample of a West Texas cracked distillate, having the following inspection:

Sp. gr.—54.3° A. P. I.
Sulphur content—0.410% by wt.
Sour sulphur—0.031% by wt.
Corrosive sulphur—0.173% by wt.
Doctor test—positive
Mercury test—positive
Copper strip corrosion test—positive Gum content determined by quick evaporation in a glass beaker—12 mg. was treated by shaking 15 minutes with a mixture of solid anhydrous NaOH and KOH, using 0.14 lb. of oil of NaOH and 0.36 lb./bbl. of oil of KOH. The resulting product was negative to copper strip corrosion, doctor and mercury tests. Its sulphur content was reduced to 0.206% and its gum content to 3 mg. per 100 cc.

The time of shaking is longer when high mercaptans are present in the oil than when only light mercaptans must be removed.

The sodium and potassium hydroxide mixture may be used either in solid anhydrous state or the mixture may be dissolved in a non-aqueous organic solvent such as alcohols, ethers, etc., which has a solvent action for both the alkali and the oil. If a solution of the sodium and potassium hydroxide mixture is used care should be taken that the solution does not contain more than about 2% of water. Preferably an anhydrous solution is used but a little moisture content is allowable. The mutual solvent may also be added to the oil before treatment instead of dissolving the alkali in the solvent.

The treatment on a commercial scale may be accomplished in several ways, namely:

1. The oil, to which a non-aqueous solvent mutual to both the oil and the alkali hydroxides may or may not be added, is percolated through a column containing the mixture of solid alkalies.

2. The oil, to which a non-aqueous mutual solvent for oil and alkali may or may not be added, is treated with the mixture of solid alkali hydroxides in a mechanical agitator.

3. The oil is treated with a solution of sodium and potassium hydroxides in the specified proportions, preferably with agitation.

The following precautions should be observed during the treating:

a. Air and moisture should be excluded because they have an oxidizing and hydrolyzing action respectively on the sludge formed.

b. The non-aqueous solvents must not contain more than 1-2% water, and preferably none.

c. In order to economize on the anhydrous alkali, hydrogen sulphide is preferably removed by washing the oil with an aqueous caustic solution previously to treating the oil with anhydrous reagents and the caustic solution settled from the oil.

Treatment with the mixture of sodium and potassium hydroxides may be applied to the oil alone or in combination with other treating methods, such as sulphuric acid treatment. The treatment with anhydrous alkalies is preferably done before the acid treatment, in which case a substantial saving of the acid is effected since no acid is consumed by reactions with the mercaptans. The color stability of the treated oil is also greater when the acid treat is done after the alkali treat than in the reversed case. Moreover, the mercaptans can be completely recovered from the alkali sludge by hydrolyzing it with water.

In treating the cracked West Texas distillate above mentioned with the mixture of sodium and potassium hydroxides and with doctor solution the following improvements were observed:

*1. Treat:—Anhydrous hydroxides*

7 lb. 98% acid/bbl.; caustic wash, distillation: caustic wash.

*Per cent S—0.104*

Saybolt color: 27
Gum: determined by quick evaporation in porcelain dish 2 mg. per 100 cc.
Copper strip corrosion test—negative
Doctor test—negative
Metallic mercury test—negative

Having thus described my invention what I claim is:

1. In the process of desulphurizing petroleum oil distillates with a substantially anhydrous mixture of sodium and potassium hydroxides the improvement which comprises treating with a relative amount of potassium hydroxide not less than, nor substantially more than that given by the formula $$\frac{\text{lbs. KOH}}{\text{lbs. NaOH}} = \frac{\text{lbs. corrosive S}/3.0}{\text{lbs. sour S}/0.8}$$

2. The process according to claim 1 in which the approximate relative amount of sodium hydroxide is that given by the formula $$\frac{\text{lbs. KOH}}{\text{lbs. NaOH}} = \frac{\text{lbs. corrosive S}/1.7}{\text{lbs. sour S}/0.8}$$

3. The process according to claim 1 in which a mutual organic solvent for the oil and alkali is present.

4. The process according to claim 1 comprising an additional sulphuric acid treat after the alkali treatment.

5. A process for desulphurizing a petroleum oil distillate which comprises treating said distillate with a substantially anhydrous mixture of sodium and potassium hydroxides containing about 1¼ lbs. of sodium hydroxide per pound of sour sulphur in the distillate and approximately from ⅓ to ⅔ lbs. of potassium hydroxide per pound of corrosive sulphur in the distillate.

VLADIMIR KALICHEVSKY.